May 26, 1925.
E. MONESS
1,539,424
LIQUID METER
Filed May 9, 1923
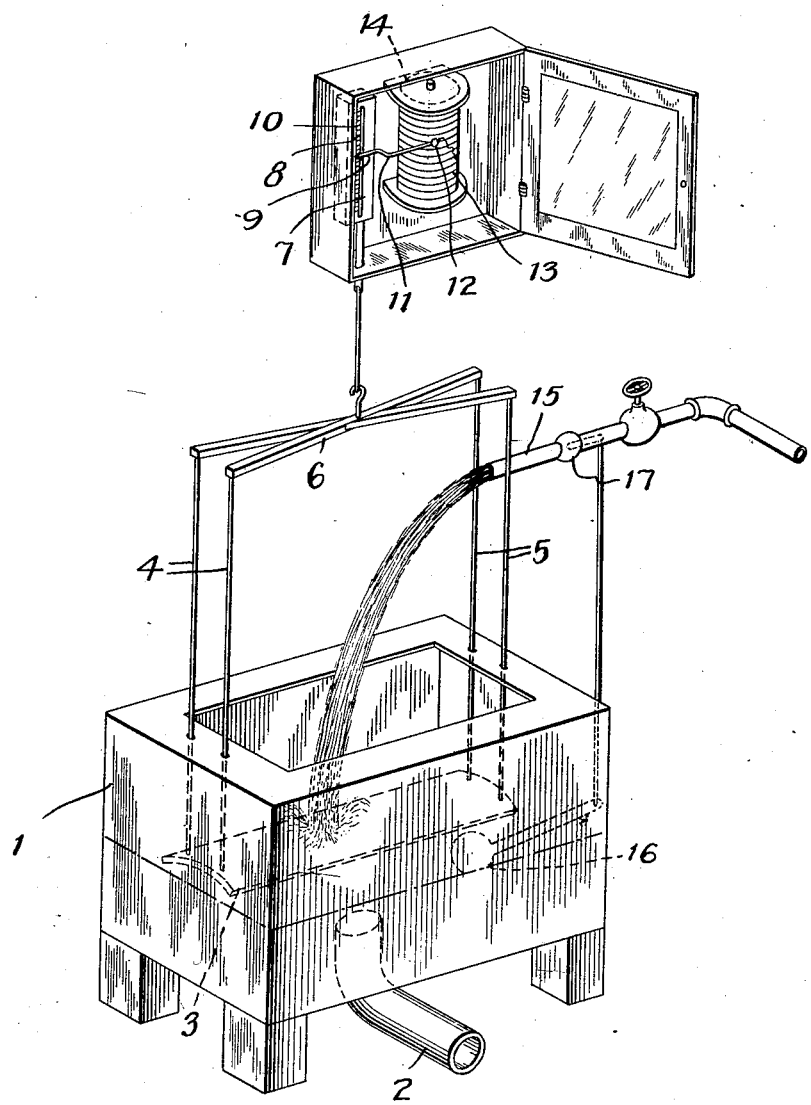
INVENTOR
Elias Moness
BY
ATTORNEY Patented May 26, 1925.

1,539,424

UNITED STATES PATENT OFFICE.

ELIAS MONESS, OF NEW YORK, N. Y.

LIQUID METER.

Application filed May 9, 1923. Serial No. 637,709.

*To all whom it may concern:*

Be it known that I, ELIAS MONESS, a citizen of the United States, residing at 787 Crotona Park north, New York city, in the county of Bronx and State of New York, have invented new and useful Improvements in Liquid Meters, of which the following is a specification.

The invention relates to liquid meters for varying rates of flow of a liquid, and particularly to boiler-feed meters. The special object is to provide a very simple and reliable apparatus for recording on a chart the rate of flow of feed-water to a boiler.

An examplification of the invention comprises a horizontal board or the like suspended from a spring-balance; the feed-water flows out of a pipe, spout or passage several feet above the board, falls on the board and produces an impact proportional to the quantity of water flowing per unit of time. This impact acts upon or against the spring-balance, and a pen connected with the spring-balance or other part moves over a slowly rotating or traveling chart, tracing a curve which shows the rate of flow for a given period. The water falls off the board into a tank, from which it is pumped into the boiler.

The accompanying drawing is a perspective view illustrating the invention in a somewhat schematic manner.

1 is a tank having an outflow pipe 2 leading from its bottom to the fed-water pump of the boiler.

3 is a horizontal board or impact member suspended above the bottom of the tank, as by means of cords, wires or rods 4, 5 and a frame 6, from a spring-balance 7 comprising a spring 8. To the indicator 9 cooperating with the scale 10 of the spring-balance is attached an arm 11, carrying a pen or tracer 12. The pen marks upon a chart 13 placed upon a cylinder 14, which is rotated slowly at a predetermined rate in a known manner. Obviously a circular chart may be used. 15 is the pipe from which the stream falls upon the board. In some cases the indicator and scale of the spring-balance might be omitted, the essential being that the impact of the falling stream on the board be transmitted to and act against a spring. Manifestly the pen might be connected at another point in the mechanism, and may be actuated either directly or indirectly. The preference, however, is for the very simple yet complete form of apparatus illustrated.

The particular advantage of an apparatus embodying the invention is its extreme simplicity and cheapness. Existing meters for the purpose are comparatively expensive, due largely to the fact that such meters have the pen operated by a float in a tank. The float rises and falls with the level of water in the tank, but this motion is not proportional to the flow, but to the two-fifth power of the flow; hence an expensive cam arrangement is necessitated to transform the float motion into a motion directly proportional to the discharge.

Besides its advantages of simplicity, the present meter can be used for both hot and cold water, it has almost no friction, and should be capable of operating for a long time without deterioration.

The level in the tank is kept below the board. For this purpose a float 16 connected with and controlling a valve 17 in the supply pipe is shown. As more or less water is withdrawn by the pump the discharge of water onto the board is regulated accordingly and the fluctuating rate of flow is recorded on the chart.

It will be apparent that numerous other embodiments of the invention may be devised.

What I claim as new is:

1. A meter of the kind described, having a yieldingly supported board, means for causing a stream of liquid to fall upon the board, and spring means for supporting said board, against which the impact of the falling stream upon the board acts.

2. A meter of the kind described, having a yieldingly supported board, means for causing a stream of liquid to fall upon the board, a supporting spring against which the force of the falling stream on the board acts, and a pen and connections whereby the pen is operated by and in accordance with the resulting movements of the board.

3. A meter of the kind described comprising a tank, a board, a spring-balance from which the board is suspended, means for causing a stream to fall upon the board, and a pen connected with the spring-balance.

4. A meter of the kind described, having a tank and means for withdrawing liquid therefrom, a suspended board, means for delivering a falling stream upon the board, a spring balance supporting the board, against which the impact of the falling stream on the board acts, recording means operated by and in accordance with the resulting movements of the board, a float in the tank, and a valve and a connection between the float and the valve whereby the latter may regulate the delivery of liquid into the tank, the relations being such that the level in the tank is kept below the board.

ELIAS MONESS.